United States Patent [19]

Ryan et al.

[11] Patent Number: 4,614,162
[45] Date of Patent: Sep. 30, 1986

[54] APPARATUS AND METHOD FOR DISTRIBUTION OF SEASONINGS AND LIKE GRANULAR/POWDERED MATERIALS

[75] Inventors: Philip J. Ryan, Dallas; Pravin Desai, Carrollton, both of Tex.

[73] Assignee: Frito-Lay, Inc., Dallas, Tex.

[21] Appl. No.: 618,224

[22] Filed: Jun. 7, 1984

[51] Int. Cl.$^4$ .............................................. B05C 19/00
[52] U.S. Cl. ...................................... 118/19; 118/24; 222/1; 222/310; 222/412
[58] Field of Search .................... 118/19, 24; 222/310, 222/314, 412, 413, 1

[56] References Cited

U.S. PATENT DOCUMENTS

| | | | |
|---|---|---|---|
| Re. 30,967 | 7/1982 | Ferrara et al. | 222/58 |
| 3,186,602 | 6/1965 | Ricciardi | 222/161 |
| 3,310,205 | 3/1967 | Meyer | 222/412 X |
| 3,890,923 | 6/1975 | Dumoulin | 118/19 |
| 3,967,758 | 7/1976 | Ferrara | 222/58 |
| 4,054,784 | 10/1977 | Ricciardi et al. | 364/479 |
| 4,111,272 | 9/1978 | Ricciardi et al. | 177/50 |
| 4,210,963 | 7/1980 | Ricciardi et al. | 364/567 |
| 4,301,510 | 11/1981 | Ricciardi et al. | 364/567 |
| 4,320,855 | 3/1982 | Ricciardi et al. | 222/56 |
| 4,419,953 | 12/1983 | Fowler | 118/19 X |
| 4,493,442 | 1/1985 | Hanson, Jr. | 222/412 X |

Primary Examiner—John P. McIntosh
Attorney, Agent, or Firm—Bernard, Rothwell & Brown

[57] ABSTRACT

A dispenser for distributing food seasoning and other cohesive solids includes a rotating auger enclosed by a tube which is fed via a hopper. The auger is divided into two sections, each with a different pitch. In a first metering section, the pitch is narrow to facilitate accurate metering of the seasoning. This is followed by a distribution section of higher pitch which reduces the bulk density of the seasoning so that it passes easily through a series of apertures in the tube. A sleeve is slidably secured to the tube and has a series of apertures registerable with the apertures in the tube. By adjusting the degree of register, the seasoning can be distributed evenly along the entire length of the distribution section. The tube contains a second set of apertures located about 180° from the first set, and which are used for distribution of non-cohesive, small particle size material, such as salt. The dispenser may be mounted in a rotating drum and used for seasoning snack food, such as potato chips and the like.

13 Claims, 10 Drawing Figures

APPARATUS AND METHOD FOR DISTRIBUTION OF SEASONINGS AND LIKE GRANULAR/POWDERED MATERIALS

BACKGROUND OF THE INVENTION

1. Field of the Invention

This invention relates to improvements in apparatus for distribution of seasonings, e.g., seasonings as placed on potato chips, corn chips, and like snack foods or for distribution of similar granular/powdered materials which are required to be evenly distributed in accurately metered quantities.

2. Prior Art

Practically all snack foods known today contain seasonings of one form or the other on their surface. Examples include potato chips seasoned with salt, barbeque flavoring, sour cream and onion flavoring, etc. Corn chips and other snack foods are also similarly seasoned. The distribution of such seasoning greatly affects not only the product quality, but the economy of manufacturing. Almost all seasonings vary in their flow properties. The metering of seasonings is important to insure that only the proper amounts of seasonings are applied and the distribution of seasonings is important to see that the seasonings are evenly distributed over the product. Certain seasonings in favor with consumers of potato chips, for example, barbeque, sour cream and onion seasoning, are sticky, lumpy and very difficult to dispense. Not only those seasonings, but all seasonings present difficult problems in metering and control.

It is known in the art to apply seasonings from a hopper through a metering tube. U.S. Pat. No. 3,186,602 discloses a metering tube having concentric large and small augers rotating independently to provide both metering and distribution functions. Metered seasoning exits the tube from the open end. Acrison, Inc., of Moonhachie, N.J., supplies commercially available equipment in which a motor-driven auger extends through the side of a hopper and through a relatively short measuring tube, e.g., a tube about two feet long. With proper attention to engineering principles, the amount of material can be metered out the end of the tube with some degree of accuracy. In a new Acrison, Inc. arrangement after the seasoning is metered in a measured quantity out the end of the tube there is a movable flap which contacts and attempts to distribute the metered material uniformly.

There is, however, a need in the art to both meter accurately and dispense uniformly by the same apparatus without utilizing separate movable parts such as a flapping distributor and for efficiently and effectively handling seasoning powders which tend to form clumps.

SUMMARY OF THE INVENTION

This invention relates to an apparatus for distributing seasoning which includes the hopper metering tube and auger of the prior art, but is a significant improvement in that the metering tube is substantially longer than that needed for accurate metering providing both a metering section and beyond the metering section a distribution section. The auger itself also is unitary but has two sections each with a different pitch. The pitch of the auger in the distribution section is greater than the pitch of the auger in the metering section. Also, apertures are provided in the bottom of the tube in the distribution section so that seasoning metered in the metering section and then fluidized in the distribution section is distributed through the apertures. The seasoning is thereby completely dispensed and distributed prior to reaching the end of the metering/distribution tube. A sleeve is optionally provided which fits over the tube and which has a series of apertures of substantially the same size as the apertures in the tube. Axial or tangential movement of the sleeve gives control over the flow of seasoning through the tube apertures by adjustment of the degree of register between the tube and the sleeve apertures. A second set of tube apertures may also be provided for distribution of small particle size, non-cohesive solids such as salt. This second set of apertures is located about 180° from the first set and are brought into play by rotation of the tube.

DESCRIPTION OF THE PREFERRED EMBODIMENT

Figure 1:
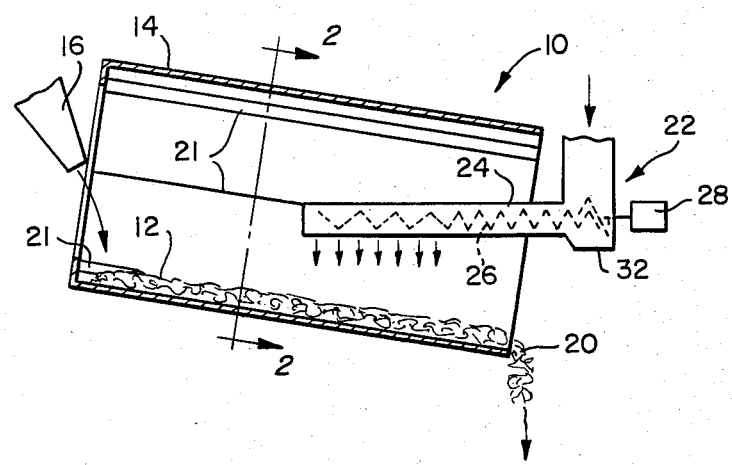
FIG. 1 is a schematic sectional elevation view of a seasoning distribution system containing the apparatus of this invention.
Figure 2:
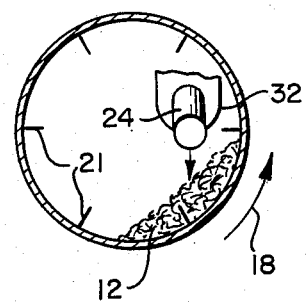
FIG. 2 is a schematic sectional view taken along line 2—2 of FIG. 1.

While the invention is not to be limited by any specific theory of operation, a number of theoretical considerations have been found to be useful in generally describing the operation of the mechanical conveyance of solids by a rotating auger within an enclosed volume, such as a tube. For a given delivery rate, F (in pounds per minute), and bulk density $\rho_B$, of the solid material to be conveyed, supplied by operating the auger at R revolutions per minute, the volume V of material which should ideally be delivered by one rotation of the auger is given by:

$$V = \frac{F}{\rho_B \times R}$$

This volume V can also be defined by:

$$V = \frac{\pi D^2}{4} P_M - (\text{Volume of auger})$$

where D is the inside tube diameter, and $P_M$ is the auger pitch. The volume of the auger is its cross sectional area times its length. The relationship of length, tube circumference and pitch can be represented by a right triangle with length as the hypotenuse, one of the acute angles being $\theta$, the side opposite $\theta$ representing the pitch, $P_M$, and the remaining side being the circumference.

Thus, with known volume of the auger (usually small compared to tube volume), the delivery rate can be represented by:

$$F = \rho_B \times R \times \left( \frac{\pi D^2}{4} P_M - \frac{\pi D}{\cos \theta} \times t_b^2 \right)$$

where $t_b$ is the thickness of the auger (assuming a square cross section) and $\theta$ is the flight angle.

The above equations assume 100 percent positive displacement and thus describe the ideal or maximum flow rate which can be achieved. Under most conditions, a lesser flow rate is observed due to what has been discovered to be considerable slip between the auger and the conveyed material.

Slip can be defined as the difference between theoretical flow and practical or actual flow. With the rest of the parameters constant ($\rho_B$, RPM, friction factor, etc.) the flight angle $\theta$ and hence pitch is the major variable contributing to slip. Thus, when $\theta = 90°$, pitch is infinite and slip is maximum, that is, the auger is essentiallly a straight piece of bar stock. In this position, there would be no flow. When $\theta = 0$, slip is minimum but there is no flow because channel volume is 0. The flow rate can be characterized by the following equation:

$$F = \rho_B \times R \times \left( \frac{\pi D^2}{4} P_M - \frac{\pi D}{\cos \theta} \times t_b^2 \right) \times K_1 [1 - \sin \theta]$$

where $K_1$ is a dimensionless number between 0 and 1 empirically determined for a particular conveyance system. The optimum design for a system in which the conveyed material must be metered accurately and flow rate maximized is that in which slip is at a minimum. While the optimum pitch varies from system to system, generally a flight angle of from about 30° to about 60° results in a pitch which is satisfactory for metering of the conveyed material.

Once the material, such as seasoning, has been metered accurately within the tube, there remains a problem of dispensing it from the tube in the desired manner. In this invention, dispensing is accomplished through a series of apertures near the end section of the tube and through which the seasoning falls in the form of a wide dispersion "curtain". If the material has a cohesive nature, as do most seasonings, it will by nature remain in clumps and not pass through the apertures in the dispersion section of the tubing. The portion of the auger which conveys the material through this dispersion section must therefore be capable of reducing or eliminating clumping and simultaneously, of increasing the flowability to produce uniform dispersion through the apertures.

Flowability of small particle size solids increases as bulk density decreases. In the auger conveyance-type device of this invention, reduction in bulk density is achieved by an expansion of auger pitch, which spreads out or "fluidizes" the material from its relative dense state in the metering section. Maximum flowability is achieved when the pitch is expanded to an extent causing the bulk density to be reduced to the value observed in conventional fluidization, for example, in a fluidized bed. To obtain this value for a given solid material, such as a seasoning, a fluidized bed is constructed using well-known means, and the change in the height of the bed from the nonfluidized to the fluidized state is measured. An auger pitch should achieve an approximate density in such fluidized state in the particulate material after the material passes from the metering zone to the distribution zone.

By way of background, in order to explain a particular application of this invention, a seasoning distribution apparatus is illustrated in FIGS. 1 and 2, where the apparatus is indicated generally by the number 10. Unseasoned snack food 12 enters a cylindrical drum 14 at one end through a funnel 16. Drum 14 is tilted slightly at an angle of about 5° and is axially rotated in the direction indicated by arrow 18. The speed of rotation is preferably between 10 and 15 RPM. The combination of tilt and rotation causes the snack food to travel continuously down the drum to exit 20. Baffles 21 may be positioned radially on the drum perimeter to aid in mixing the snack food. A horizontal, non-rotating seasoning dispenser 22 has a tube portion 24 extending into the drum. Within the tube 24 is an auger 26 in close tolerance with the tube inner wall. The auger is rotated by a power source 28 such as an electric motor. This tumbling drum arrangement and the application in general of seasoning falling from a tube to snack food therein is well known and conventional in the art. Seasoning 30, such as barbeque, sour cream, etc., is fed to the dispenser via a hopper 32 and is conveyed along the tube 24 by the auger 26. A series of apertures 34 in the bottom of the far end of the tube 24, opposite the hopper 32, allows the seasoning to drop by gravity onto the snack food. As indicated by arrows 36, the seasoning is distributed in the form of a dispersion "curtain".

The seasoning dispenser 22 may be positioned offset from the cross-sectional center of the drum, as shown in FIG. 2, in order to distribute the seasoning over the location of maximum concentration of snack food. Because of the drum rotation, the snack food tends to migrate up the drum wall, and thus the maximum concentration is located at a point other than the lowest portion of the drum. The optimum position for the dispenser is, of course, dictated by the degree of migration of the snack food, which in turn is dependent on the speed of rotation and tilt angle of the drum, and the size and number of baffles along the drum perimeter. Those skilled in the art can readily ascertain the proper location for the dispenser based upon a given set of the above process parameters.

FIGS. 3 and 4 illustrate various aspects of the unique seasoning dispenser 22 of this invention. Auger 26 is a helical configuration of metal bar stock preferably having a square cross-section as shown in FIG. 4, although other cross sections, such as rectangular, triangular and the like may also be employed. The auger has two sections which are distinguished by the degree of pitch, namely, a metering section 38 and a distribution section 40. In the metering section 38, seasoning 30 completely or nearly completely fills the void volume of the tube and the density is about equivalent to the bulk density in the delivery hopper 32. This provides a relatively high bulk density which aids in the accurate metering of the seasoning.

In the distribution section 40, the increased pitch of the auger causes a significant reduction in bulk density of the seasoning. A lower bulk density "fluidizes" the seasoning and facilitates passage of the seasoning through the apertures 34 which occupy at least the end portion of the distribution section, that is, at least the last third of section 40. Preferably apertures 34 are present along the entire length of the distribution section.

Figure 3:
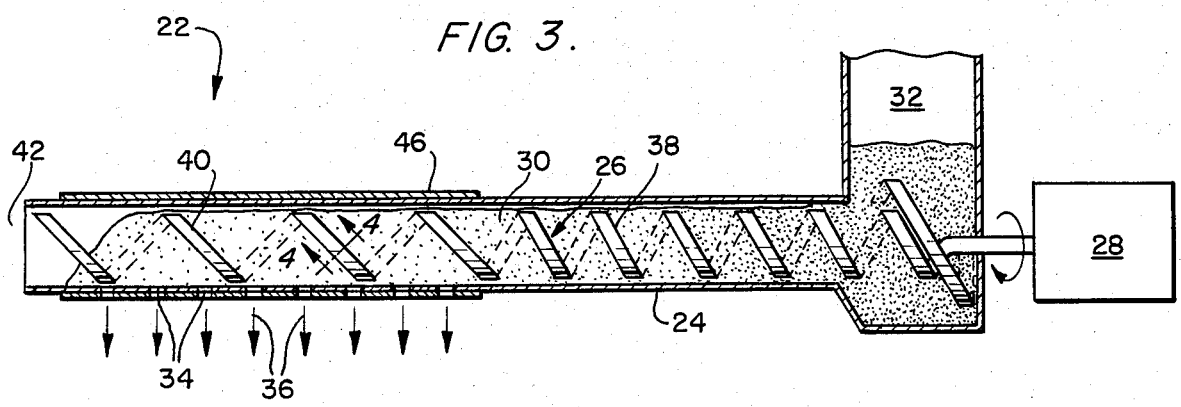
FIG. 3 is a side-elevation view partially in section of the apparatus of this invention with an auger shown in its metering tube.
Figure 4:
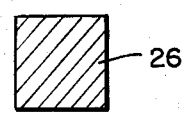
FIG. 4 is a sectional view taken along lines 4—4 of FIG. 3.

As can be seen in FIG. 3, the seasoning is completely dispensed from the distribution section 40 before it reaches open end 42 of the tube.

Figure 5:
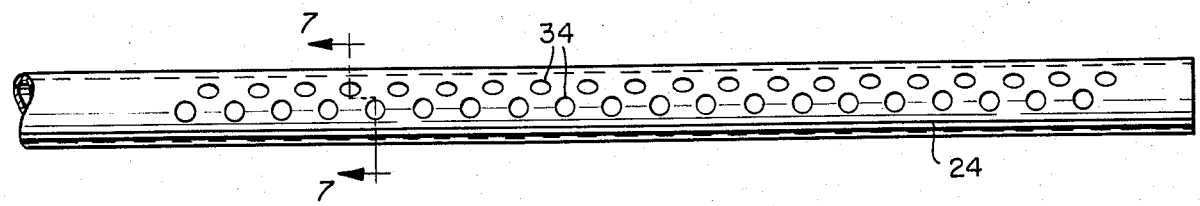
FIG. 5 illustrates the aperture arrangement in the metering tube.
Figure 6:
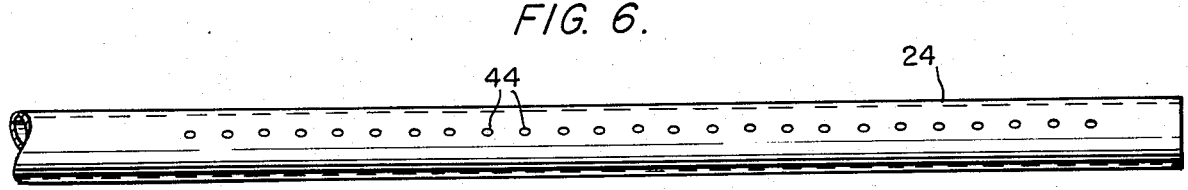
FIG. 6 illustrates a second set of apertures in the metering tube.
Figure 7:
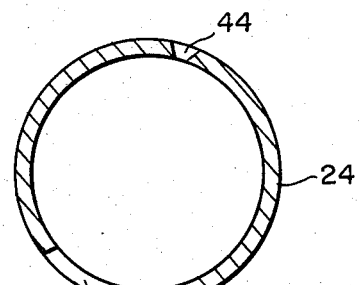
FIG. 7 is a cross sectional view of the metering tube taken along line 7—7 of FIG. 5 showing the relative arrangement of the two sets of apertures.
Figure 8:
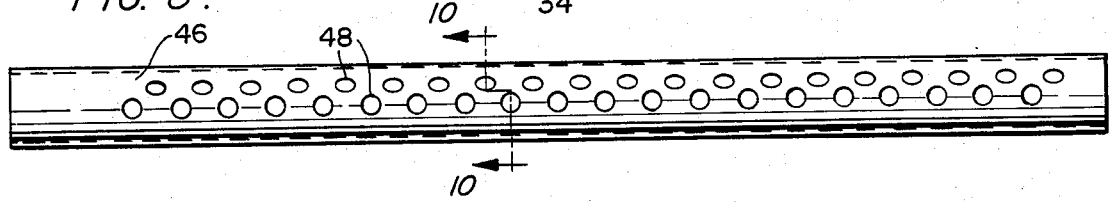
FIG. 8 illustrates a metering sleeve surrounding the metering tube having apertures therein.
Figure 9:
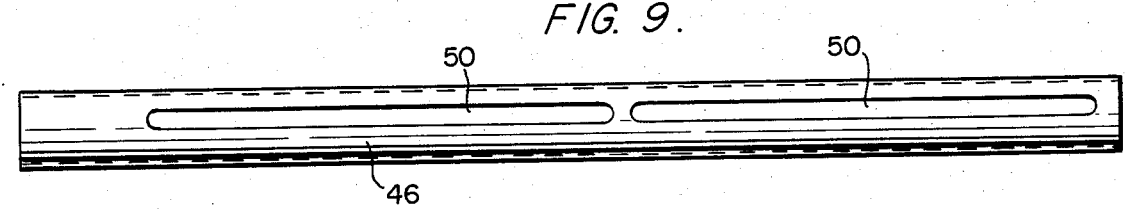
FIG. 9 illustrates slots in the opposite side of the metering sleeve of FIG. 8.
Figure 10:
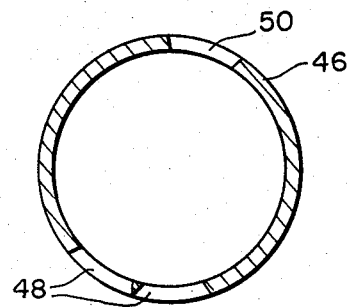
FIG. 10 is a cross sectional view of the sleeve taken along line 10—10 of FIG. 8 showing the relative arrangement of the apertures and slots.

FIGS. 5, 6 and 7 illustrate a preferred arrangement of dispensing apertures in the tube 24. Apertures 34 are preferably laid out in two rows. In addition, the metering tube may also be provided with a second set of apertures 44 located about 180° opposite the apertures 34. Apertures 44 are somewhat smaller than apertures 34 and are used for the distribution of non-cohesive, finely divided seasonings, which have high bulk density such as salt. Use of apertures 44 requires that the tube have a means for rotation such that this second set of apertures can be positioned at the proper location for dispersion. By incorporating apertures 44 into the tube, the invention eliminates the need for a separate apparatus specifically designed for dispensing salt and similar materials. The number and spacing of apertures 34 and 44 can vary depending on the application. A preferred configuration is shown in FIGS. 5 and 6, where there are forty apertures 34 at a spacing of about 1¼ inches apart and twenty-five apertures 44 spaced about 1 inch apart. If two rows of apertures 34 are used, they are preferably staggered such that the arc between the center lines of the two rows is about 35°.

FIG. 7 shows the preferred orientation of the two sets of apertures 34 and 44. Apertures 34 and 44 should have a taper as shown which reduces clogging or "bridging", which is the retention of dispensed material in the apertures. The taper is preferably about 60°. Apertures 34 preferably have a diameter of about ½ inch but may be anywhere from about ⅛ inch to about 1 inch in diameter. Apertures 44 are preferably about 7/64 inch in diameter but may vary from about 1/32 to about ¼ inch diameter.

The orientation of these apertures with respect to vertical is significant. When viewed as in FIG. 7, one set of staggered holes should be centered on vertical and the other set should be offset in the direction of auger rotation. This eliminates the tendency for the auger to carry material along the solid inside wall of the tube.

A sleeve 46 may optionally be placed over the tube 24 as shown in FIG. 3. The use of sleeve 46 is preferred to accommodate the various types of cohesive seasoning which require different sized apertures for effective dispersion. The sleeve can be moved axially (or rotationally) relative to the tube, by manual or automatic means (not shown). As seen in FIG. 8, the sleeve has flow control apertures 48 which can be partially or wholly registered with apertures 34. By adjusting the amount of register through axial or rotational movement of the sleeve, the dispersion curtain of seasoning can be maintained along almost the entire length of the distribution section or along any fraction thereof. For most types of cohesive seasoning, the amount of register is between about 80% and about 20%, that is, the area open for passage of seasoning is between 80% and 20% of the total cross-sectional area of apertures 34. Preferably, the amount of register is between about 50% and 20%.

Thus, if apertures 34 have too large a diameter for the seasoning, most of the distribution takes place in the first two-thirds or less of the apertures, often undesirably resulting in poor dispersion. Conversely, if the open area of the apertures is too small (too little register between flow control apertures 48 and apertures 34), the seasoning curtain will extend beyond the apertures and seasoning will pass out the end 42 of the tube. The provision of a sleeve over the tube 24 enables a reproduceable dispersion curtain to be obtained irrespective of the type of seasoning used and within the design limits, irrespective of the delivery rates required.

When apertures 44 are to be used to distribute salt or similar materials, that is, when tube 24 is rotated as described above, sleeve 46 rotates with the tube. As seen in FIG. 9, aligned with the apertures 44 are one or more slots 50 through which the salt falls after passing through apertures 44. It has been found that generally no adjustment of the distribution curtain is necessary when distributing salt. Thus, slots are preferred over flow control apertures. Indeed, provided that there is adequate slidable securement of sleeve 46 to the tube, that portion of the sleeve aligned with the apertures 44 could be eliminated entirely. Alternative means such as teeth of different depth can be used to cover selected apertures and control flow.

The orientation of the flow control apertures 48 and slots 50 can be seen in FIG. 10. Apertures 48 have the same dimensions as apertures 34. Slots 50 have a width sufficient to allow unimpeded flow of salt. The sleeve is preferably in close tolerance with tube 24 to avoid any accumulation of dispensed material therebetween.

Seasoning is preferably dispensed in continuous fashion from seasoning dispenser 22. That is, auger 26 is continuously rotated to convey the seasoning along the tube 24. With regard to the amount of seasoning dispensed per unit of time, this is in the first instance controlled by the rotational speed of the auger 26 and the pitch of the auger sections, particularly section 38 which functions as the metering mechanism. If slip is controlled in the metering section through proper auger design, flow is a function primarily of the auger rotational speed and hence is subject to reasonably precise measurement. Those skilled in the art can readily determine the rotational speed required for dispensing the seasoning at the desired rate for a given auger pitch. Normally, a higher auger RPM is used with apertures 34 than with apertures 44. Additional control of the amount of seasoning distributed may be accomplished by manipulating the tube 24 and sleeve 46 to control the registry and opening of the apertures.

Generally it has been found that the metering section should be at least about 1½ feet in length to provide proper flow control of the seasoning. The transition from metering section 38 to distribution section 40 is relatively abrupt so that the seasoning is quickly spread out and distributed over the apertures 34. The pitch of the auger in distribution section 40 is at least about 1¼ times, and preferably at least 1½ times the pitch of the auger portion in metering section 38. The total length of the tube is at least half again as long as that needed to properly meter the seasoning, the distribution section 40 occupying this additional tube length, namely, at least about 9 inches. Desirably, the distribution section is from about 18 inches to about 30 inches with apertures 34 and 44 occupying the entire length of the section of the tube containing the auger distribution section.

In a preferred embodiment, particularly intended to deliver about 125 lbs/hr of seasoning with a bulk density of 28–41 lbs/ft$^3$ the metering tube 24 has a length of between 4 and 5 feet and an inner diameter of about 1½ inches. Metering section 38 has a pitch of about 1 inch, which has been found to be optimum for correct metering of the seasoning. This results in a flight angle of about 40°. Distribution section 40 of the auger has a pitch of about 1½ inches. This expanded pitch, as well as fluidizing the seasoning, greatly increases the uniformity of distribution and thereby overcomes the problems associated with the seasoning material's cohesive nature. The auger itself is constructed of ¼ inch square metal stock. The apertures 34 and 44 extend from about the last 24 inches of the tube and have diameters of ½ inches and 7/64 inches, respectively. There are forty apertures 34 and twenty-five apertures 44.

The drum 14 of the dispenser preferably has a length of about 8 feet and a diameter of about 2½ feet. The bed of snack food is generally about 4 inches deep in the drum. Again, these values for the parameters of the seasoning distribution apparatus and dispenser are preferred, and not meant to be limiting.

The improved dispersion of seasoning provided by the invention allows passage of the seasoning through the apertures 34 at a uniform rate. This in turn leads to a predictable level of seasoning being placed on the snack food, minimizing product loss and providing subsequent savings in the costs of seasoning. The even flow also tends to minimize clogging of the auger and the apertures, thus reducing maintenance downtime.

While the best mode and the preferred embodiments have been disclosed it is to be understood that the invention is not limited thereto or thereby. For example, although much of the discussion above relates to the distribution of seasoning, the invention is equally adaptable to the distribution and dispensing of other cohesive solids. Accordingly, for a fuller understanding of the scope of the invention, reference should be made to the appended claims.

What is claimed is:

1. A dispenser for distribution of seasonings and like granular/powdered materials of the type having a hopper for the seasonings, a tube in fluid communication with the hopper, the tube having an open outer end, and a motor-driven auger extending through the hopper and the tube, with the improvements comprising: the auger being in the form of a helical configuration of a bar inside the periphery of the tube leaving the center portion of the tube unobstructed, and having a metering section adjacent the hopper and a distribution section extending beyond the metering section in the direction of movement of the seasoning material, each section of the auger having a different pitch, the pitch of the auger in the distribution section being at least about one-and-fourth times the pitch in the metering section, and a set of seasoning distribution apertures extending along at least the end portion of the tube beneath the distribution section of the auger.

2. A dispenser as in claim 1, wherein said dispenser includes a sleeve slidably secured over the tube and having a set of apertures adjustably registerable with said seasoning distribution apertures.

3. A seasoning dispener as in claim 2 wherein the tube has a length of from about 4 to about 5 feet and an inner diameter of about 1½ inches; and wherein said seasoning distribution apertures extend from about 18 inches to about 30 inches along the end length of the tube and have a diameter of from about ⅛ inch to about 1 inch.

4. A dispenser as in claim 3 having a metering section of at least about 1½ feet in length.

5. A dispenser as is claim 4, wherein the dispenser is installed in a seasoning distribution apparatus which includes a rotating drum.

6. A dispenser as in claim 5, the metering section having a pitch of about 1 inch and the distribution section having a pitch of about 1½ inches.

7. A dispenser as in claim 6, wherein the amount of register between the sleeve apertures and the seasoning distribution apertures is from about 80 to 20 percent.

8. A dispenser for distribution of seasoning and like granular/powdered materials of the type having a hopper for the seasonings, a tube in fluid communication with the hopper, the tube having an open outer end, and a motor-driven auger extending through the hopper and the tube, with the improvements comprising: the auger being in the form of a helical configuration of a bar inside the periphery of the tube leaving the center portion of the tube unobstructed, and having a metering section adjacent the hopper and a distribution section extending beyond the metering section in the direction of movement of the seasoning material, each section of auger having a different pitch, the pitch of the auger in the distribution section being at least about one-and-one-half times the pitch of the auger in the metering section, a set of seasoning distribution apertures extending along at least the end portion of the tube beneath the distribution section of the auger, and a second set of apertures for dispensing noncohesive, small particle size material positioned about 180° from the seasoning distribution apertures.

9. A dispenser as in claim 8, wherein said second set of apertures have a diameter of from about 1/32 to about ¼ inch.

10. A seasoning dispenser as in claim 9, wherein the flight angle in the metering section of the auger is from about 30° to about 60°.

11. A dispenser as in claim 10, wherein said dispenser includes a sleeve slidably secured over the distribution section of said tube and having a set of apertures adjustably registerable with said seasoning distribution apertures.

12. A dispenser as in claim 11, wherein said sleeve includes one or more slots registerable with said second set of apertures in the tube.

13. A method for distributing seasoning and like granular/powdered materials, comprising:
feeding seasoning to one end of a tube, the tube having disposed therein a rotating dual-pitch auger, the auger being in the form of a helical configuration of a bar inside the periphery of the tube leaving the center portion of the tube unobstructed, the other end of said tube left unsealed;
metering the seasoning in a first auger section having a pitch useful for accurate metering;
distributing the metered seasoning in a second auger section having a pitch of about one and one-half times the pitch in the first auger section; and
dispensing the seasoning through a series of apertures in the tube extending at least along the end portion thereof beneath the second auger section, said seasoning being completely dispensed prior to reaching the unsealed end of the tube.

* * * * *